(12) United States Patent
Loveless

(10) Patent No.: US 10,850,759 B2
(45) Date of Patent: Dec. 1, 2020

(54) PALLET TRUCK WHEEL ASSEMBLY TOE GUARD

(71) Applicant: GPS, Inc., Beaverton, OR (US)

(72) Inventor: Christopher Scott Loveless, Beaverton, OR (US)

(73) Assignee: GPS, Inc., Beaverton, OR (US)

( * ) Notice: Subject to any disclaimer, the term of this patent is extended or adjusted under 35 U.S.C. 154(b) by 350 days.

(21) Appl. No.: 15/944,352

(22) Filed: Apr. 3, 2018

(65) Prior Publication Data

US 2019/0300037 A1    Oct. 3, 2019

(51) Int. Cl.
*B62B 5/00* (2006.01)
*B62B 3/06* (2006.01)

(52) U.S. Cl.
CPC .............. *B62B 5/0006* (2013.01); *B62B 3/06* (2013.01)

(58) Field of Classification Search
CPC ........ B62B 5/0006; B62B 3/06; A01D 34/828
See application file for complete search history.

(56) References Cited

U.S. PATENT DOCUMENTS

| | | | | |
|---|---|---|---|---|
| 2,963,842 A * | 12/1960 | Estes | .................... | A01D 34/828 56/320.1 |
| 2,982,079 A * | 5/1961 | Schesser | .............. | A01D 34/828 56/17.4 |
| 3,036,651 A | 1/1962 | Paul | | |
| 3,226,920 A * | 1/1966 | Gilbertson | ........... | A01D 34/828 56/255 |
| 3,378,995 A * | 4/1968 | Welsh | .................. | A01D 34/828 56/320.1 |
| 3,385,041 A * | 5/1968 | Douglas | ................. | A01D 43/02 56/255 |
| 3,501,902 A * | 3/1970 | Dahl | ..................... | A01D 34/828 56/17.4 |
| 3,555,793 A * | 1/1971 | Chapman | ............. | A01D 34/828 56/17.4 |
| 3,560,021 A * | 2/1971 | Watson | ................ | B62D 25/168 280/851 |
| 3,608,922 A * | 9/1971 | Best | ...................... | B62B 3/0618 280/43.12 |
| 3,675,943 A * | 7/1972 | Moore | ................. | B62D 25/168 280/851 |
| 3,797,213 A * | 3/1974 | Sadow, Jr. | ........... | A01D 34/828 56/320.1 |
| 3,927,513 A * | 12/1975 | Ramaker | .............. | A01D 34/828 56/320.1 |
| 4,134,249 A * | 1/1979 | Wuerker | .............. | A01D 34/005 56/255 |

(Continued)

*Primary Examiner* — Katy M Ebner
(74) *Attorney, Agent, or Firm* — Schaffer IP Law, LLC

(57) ABSTRACT

A pallet truck wheel assembly for use on a pallet truck comprises an axle extending in a horizontal plane that includes a central portion configured to couple with a steering column of a pallet truck and shoulders at each terminal end of the axle. A pair of rear steer wheels having center bores receiving and rotatable about the axle are mounted on the axle in a spaced-apart configuration so that a central portion of the axle spaces the wheels apart between inboard portions of the steer wheels and the shoulders are exposed on each outboard portion of the steer wheels. A toe guard coupled only to the shoulders of the axle includes a protective element that extends around the back of the wheels and below the axle so that an operator's toes are prevented from sliding under the rear steer wheels of the pallet truck.

10 Claims, 5 Drawing Sheets

(56) References Cited

U.S. PATENT DOCUMENTS

| | | | | |
|---|---|---|---|---|
| 4,172,351 A * | 10/1979 | Scanland | A01D 34/81 | 56/17.4 |
| 4,216,643 A * | 8/1980 | Malone | A01D 34/828 | 56/17.4 |
| 4,241,567 A * | 12/1980 | Carolan | A01D 34/828 | 56/17.4 |
| 4,300,334 A * | 11/1981 | Hines | A01D 76/003 | 56/17.4 |
| 4,322,938 A * | 4/1982 | Efflandt | A01D 43/0631 | 56/17.4 |
| 4,525,989 A * | 7/1985 | Lane | A01D 34/64 | 56/17.4 |
| 4,638,622 A * | 1/1987 | Smith | A01D 34/82 | 56/17.4 |
| 4,671,052 A * | 6/1987 | Martin | A01D 34/828 | 56/17.4 |
| 4,996,832 A * | 3/1991 | McKeever | A01D 34/828 | 56/17.4 |
| 5,101,617 A * | 4/1992 | Hare | A01D 34/828 | 56/17.4 |
| 5,113,960 A * | 5/1992 | Prinz | B62B 3/0612 | 180/65.51 |
| 5,703,450 A * | 12/1997 | Josephs | A01D 75/20 | 318/379 |
| 5,752,584 A * | 5/1998 | Magoto | B62B 3/06 | 187/231 |
| 7,267,349 B2 * | 9/2007 | Sica | B60G 3/185 | 187/222 |
| 7,568,708 B2 * | 8/2009 | Vietri, Jr. | B62B 3/06 | 187/222 |
| 8,011,677 B1 * | 9/2011 | Ellington | B62B 3/06 | 280/43.12 |
| 10,575,465 B2 * | 3/2020 | Ran | A01D 34/84 | |
| 2019/0307067 A1 * | 10/2019 | Hong | A01D 34/81 | |

* cited by examiner

PALLET TRUCK WHEEL ASSEMBLY TOE GUARD

BACKGROUND OF THE INVENTION

1. Field of the Invention

This application relates to a safety guard for a pallet truck, and in particular to an adjustable toe guard adapted to couple only to the axle of the rear wheel assembly of a pallet truck.

2. Description of the Prior Art

Pallet trucks are used to lift, pull, push, and move loaded pallets. A pallet truck typically includes a frame with two forks extending forwardly of the frame. Extending behind the frame is an operator handle, by which the pallet truck may be maneuvered by a worker. At least one steer wheel is provided behind the frame, and is turnable by movement of the operator handle; two steer wheels are often provided. The steer wheel(s), located behind the frame, is close to the feet of a worker using the pallet truck.

So configured, the pallet truck is pulled and pushed by a worker with the operator handle, the steer wheel(s) allowing for turning of the pallet truck by side-to-side orientation of the operator handle relative to the pallet truck frame.

In operation, the forks of a pallet truck may first be positioned beneath a loaded pallet. By thereafter pivoting the operator handle downwardly, a lifting mechanism of the pallet truck causes the frame and forks to raise, thereby lifting the loaded pallet from the surface upon which it had rested. Various lifting mechanisms have been provided in the art, which cause the forks and frame to lift the weight of the loaded pallet so that the pallet may thereafter be transported upon the pallet truck. Part of the weight of the loaded pallet truck is borne by the steer wheel(s) at the rear of the pallet truck. So loaded, the pallet truck may be pulled and pushed to a second location, and the load thereafter lowered and removed from the forks.

Various embodiments of pallet trucks are known where at least one steer wheel is included at the rear of the pallet truck near the location at which the operator of such a pallet truck is positioned during use of the pallet truck. But use of a pallet truck with a rear steel wheel (or wheels) subjects the operator to the risk of running over his/her foot with the rear steer wheel as the operator pulls the pallet truck toward himself or herself, a maneuver required in the use of such a pallet truck. Particularly with loaded pallet trucks, that risk may cause great physical injury to the foot. An operator's foot may slip to the wheel(s) while trying to pull the pallet truck toward the operator, or an operator may allow his/her foot to remain too long in the path of a steer wheel of a pallet truck rolling backwards. Furthermore, the feet of nearby co-workers are also at risk of injury from the rolling of such rear steer wheels.

Additional difficulties are encountered when the pallet truck is moved over dock plates or other raised surfaces as this could impact upon any protective element placed adjacent the steer wheels. This protective element could, for instance, impact upon the raised surface and thus prevent the pallet truck from moving over it. Alternately, if the protective element is raised too high to accommodate such raised surfaces, this could reduce the effectiveness of the protective element and still allow an operator's foot to slide under the steer wheel.

In view of the wide use of pallet trucks and the risks of injury to operators thereof of running over one's own foot or the foot of a co-worker with a rear steer wheel, it would be desirable to provide a pallet truck steer wheel safety guard with means that couple and turn with the wheels of such a pallet truck and accommodate variations in rolling surfaces.

SUMMARY OF THE INVENTION

A first aspect of the invention describes a pallet truck wheel assembly toe guard for use on a pallet truck of a type having a rear steer wheel rotatable about an axle residing and steerable within a horizontal plane relative to the pallet truck. The toe guard comprises a shroud extending in a generally U-shape configuration with a front face disposed between shroud side-panels having spaced terminal ends. Connectors are located adjacent each terminal end of the side panels. A skirt is slidingly coupled to the front face of the shroud and includes a bottom edge that extends below the connectors. The connectors are configured to attach to the rear steer wheel axle on a pallet truck with the skirt extending below the axle to a position that prevents an operator's toes from sliding under the skirt and getting crushed by the rear steer wheel of the pallet truck.

In another aspect of the invention, a pallet truck wheel assembly for use on a pallet truck is disclosed. The pallet truck wheel assembly configured according to aspects of the invention comprises an axle extending in a horizontal plane that includes a central portion configured to couple with a steering column of a pallet truck and shoulders at each terminal end of the axle. A pair of rear steer wheels having center bores receiving and rotatable about the axle are mounted on the axle in a spaced-apart configuration so that a central portion of the axle spaces the wheels apart between inboard portions of the steer wheels and the shoulders are exposed on each outboard portion of the steer wheels. A toe guard coupled only to the shoulders of the axle includes a protective element that extends around the back of the wheels and below the axle so that an operator's toes are prevented from sliding under the rear steer wheels of the pallet truck.

Yet another aspect of the invention describes a pallet truck, comprising a steering column coupled to a tow bar and defining a vertical steering axis. The pallet truck includes an axle coupled perpendicularly to the steering column and rotatable with the steering column about the vertical steering axis. A rear steer wheel is carried on the axle and defines an axis of rotation and a rear steer wheel width, where the axis of rotation resides in a horizontal plane and is turnable in the plane relative to the pallet truck. The pallet truck further includes a steer wheel toe guard that is carried solely by the axle and turnable with the steering column. The toe guard is disposed behind the rear steer wheel and defines a length parallel to the axis of rotation, with the toe guard length approximating the width of the rear steer wheel. The toe guard further defines a height perpendicular to its length, where the height extends below the plane of the axis of rotation behind the rear steer wheel.

Further aspects of the invention configure the toe guard to include a shroud coupled to each end of the axle and a skirt coupled and vertically adjustable with the shroud. The axle carries the toe guard by having its terminal ends being received within connectors provided on side-panels of the shroud, and more particularly within non-round notches formed on the connectors that receive complementary-shaped structures on the end of the axle.

The foregoing and other objects, features and advantages of the invention will become more readily apparent from the following detailed description of a preferred embodiment of the invention that proceeds with reference to the accompanying drawings.

DETAILED DESCRIPTION

Figure 1:
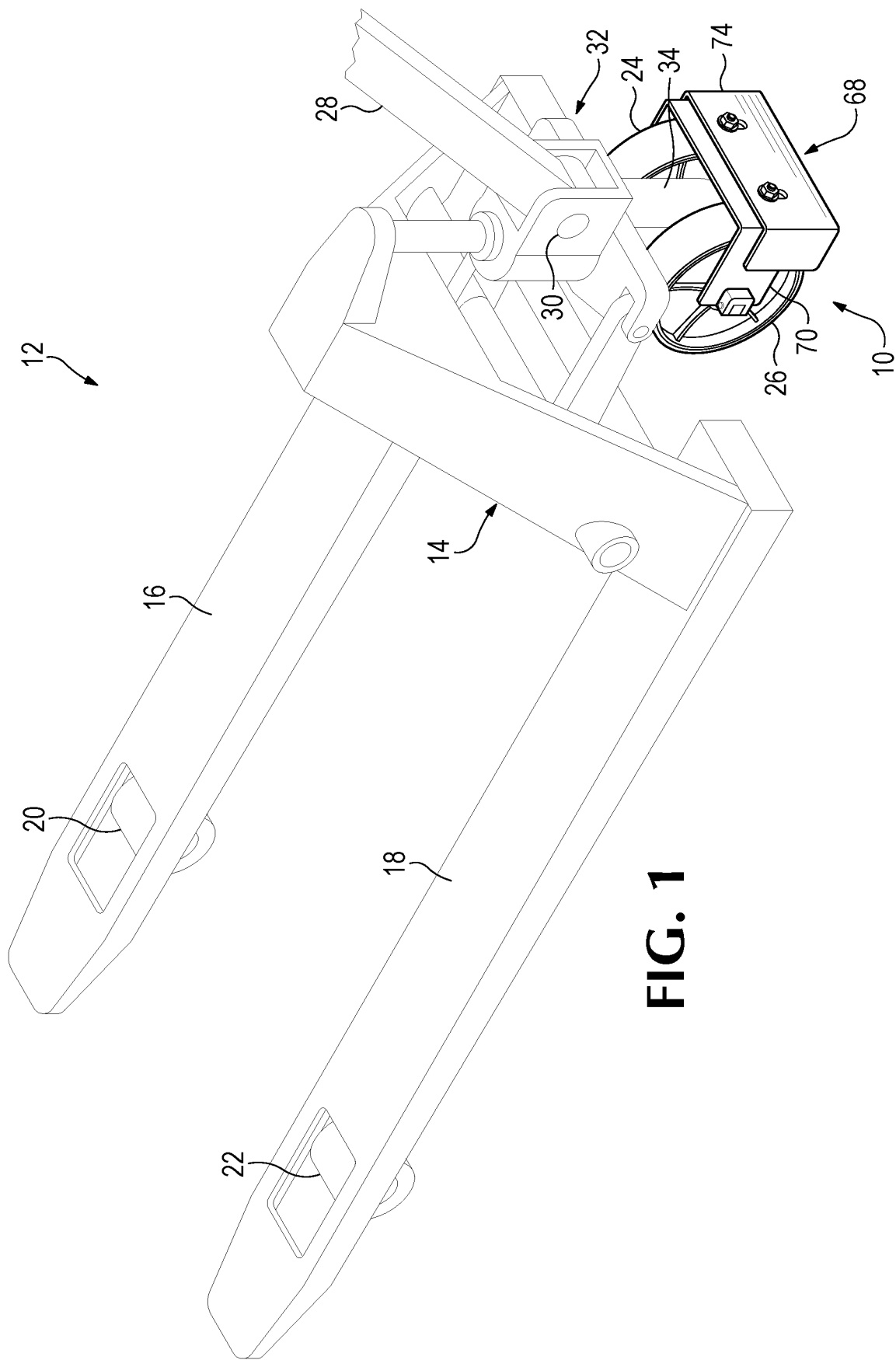
FIG. 1 is a perspective view of a pallet truck using a toe guard wheel assembly configured according to a preferred embodiment of the invention.

FIG. 1 illustrates a toe guard wheel assembly 10 installed for use with an embodiment of a pallet truck 12. The pallet truck 12 includes an A-frame 14 at the rear of the pallet truck 12 and forks 16, 18 extending forwardly from such frame. Forks 16, 18 may be rolled beneath a load as via load rollers 20, 22 at the front of the pallet truck 12 and steer wheels 24, 26 located at the back of the pallet truck. An operator would then pivot tow bar or handle 28 up and down about handle pivot pin 30 to thereby cause frame 14 and forks 16, 18 to raise, thereby also raising a load mounted atop the forks 16, 18.

As shown in FIG. 1, the pallet truck configured according to the current invention includes at least one steer wheel, and here two steer wheels 24, 26, at the rear of the pallet truck 12. By moving tow bar 28 side to side, steer wheels 24, 26 are caused to turn, thereby allowing for steering of pallet truck 12. Operation of pallet truck 12 requires that an operator lift, steer, push, and pull upon tow bar 28. To do so, the operator's feet are often positioned near the steer wheels 24, 26 and thus in danger of rolling under the wheels and being crushed by the weight of the load carried by the pallet truck 12. The toe guard wheel assembly 10 is configured to prevent an operator's toes from sliding under the wheels during manipulation of the pallet truck 12 and thus prevent injury.

Arching movement of the pallet truck 12 is accomplished by way of a steering assembly 32 coupled rearwardly of A-frame 14. Steering assembly 32 includes a vertically-mounted steering column 34 coupled to the tow bar 28 and depending downward from A-frame 14 that defines a vertical steering axis around which tow bar 28 rotates. An axle 36 coupled perpendicularly to the steering column 34 via connecting aperture 38 (FIG. 3) and carrying steer wheels 24, 26 is rotatable with the steering column 34 about the vertical steering axis. Swinging tow bar 28 side-to-side around this vertical steering axis thus causes steering column 34 to turn steer wheels 24, 26 as they move in an arc defined by the turning of the tow bar 28 and associated steering assembly 32.

Figure 2:
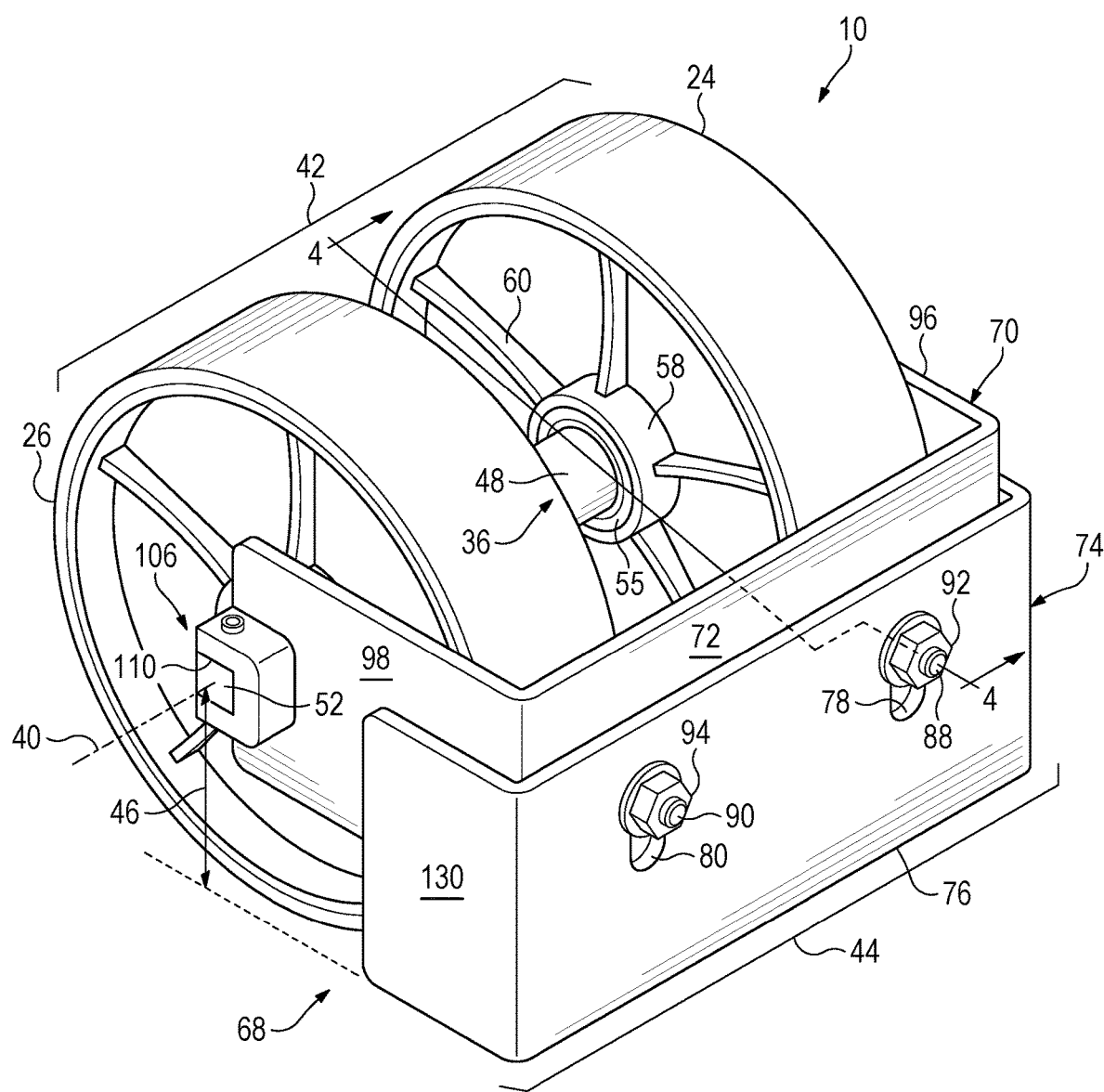
FIG. 2 is a magnified view of the toe guard wheel assembly of FIG. 1.

Turning also to FIG. 2, the rear steer wheels 24, 26 define an axis of rotation 40 and a rear steer wheel width 42, with rotation axis 40 residing in a horizontal plane and turnable in the plane relative to the pallet truck 12. The steer wheel toe guard 10 is mounted so that it is carried solely by the axle 36 and turnable with the steering column 34 as described further below. The toe guard 10 defines a length 44 that approximates the width 42 of the rear steer wheels, but is at least equal to or greater than width 42 so as to properly protect an operator's toes from sliding beneath wheels 24, 26. The toe guard 10 further defines a height 46 that is perpendicular to the toe guard length 44 and extends behind the rear steer wheels 24, 26 and below the plane of their axis of rotation 40.

Figure 3:
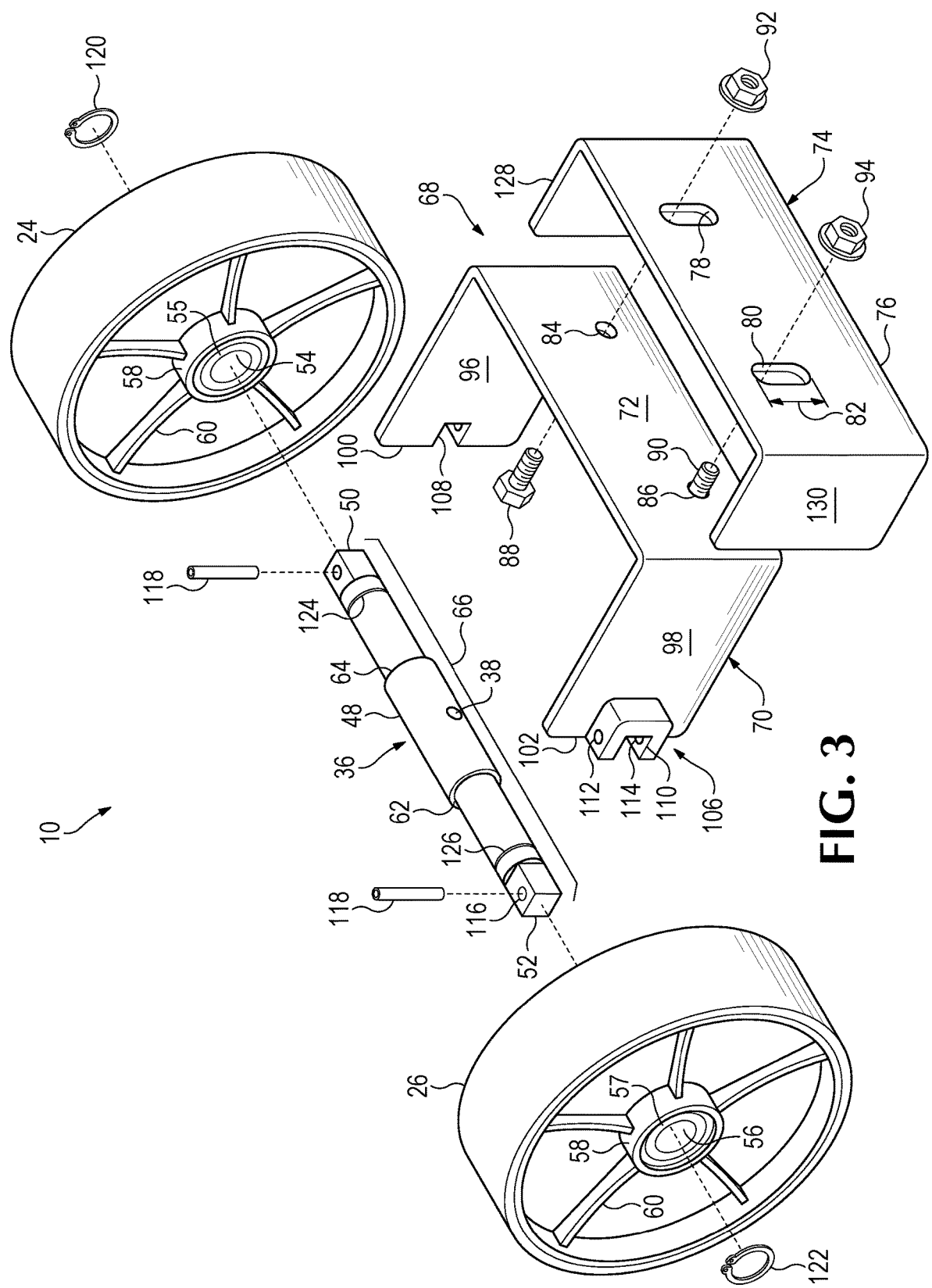
FIG. 3 is an exploded perspective view of the toe guard wheel assembly of FIG. 2.

Turning also to FIG. 3, the toe guard wheel assembly axle 36 extends in a horizontal plane along wheel rotation axis 40. Axle 36 includes a central portion 48 configured to couple with steering column 34 via aperture 38 and includes shoulders 50, 52 located at each terminal end thereof. Rear steer wheels 24, 26 are rotatable about the axle 36 via respective bores 54, 56 located centrally about a wheel hub 58 and spoke 60 system. The central axle portion 48 is preferably structured with a larger diameter than the shoulders 50, 52 and bores 54, 56. It is understood that bores 54, 56 can be the central axial opening through the wheels themselves or, more likely, a press-fit bearing 55, 57 fitted within this central axial opening and defining its own central bore (here shown as bore 54, 56) that receives the axle 36 therethrough. In this configuration, the bores 54, 56 may receive respective axle shoulders 50, 52 and slide along the axle 36 up to the central portion, e.g. adjacent rising and falling edges 62, 64, so that inboard portions of the wheels 24, 26 are maintained in spaced apart configuration by these edges 62, 64 and separated by the width of the axle central portion 48. The total length 66 of the steer wheel axle 36 is greater than the width 42 of the steer wheels and central portion 48 together so that the shoulders 50, 52 of the axle are exposed on each outboard portion of the steer wheels 24, 26 when the wheel assembly is combined as shown in FIG. 2.

A toe guard portion 68 of the toe guard wheel assembly 10 is coupled only to and carried by the shoulders 50, 52 of the axle 36. Toe guard 68 includes a protective element that extends around the back of the wheels 24, 26 and below the axle 36 and wheel rotation axis 40 so that an operator's toes are prevented from sliding under the rear steer wheels of the pallet truck. In the embodiment shown, the protective element comprises a shroud 70 coupled to the terminal ends of the axle shoulders 50, 52 and having a front face 72 disposed behind the wheels. The protective element further comprises a skirt 74 coupled to the front face 72 and having a bottom edge 76 that extends below the axle 36 and wheel rotation axis 40.

In a preferred embodiment, the shroud 70 and skirt 74 are loosely coupled together via an adjustable connector structured to enable the bottom edge 76 of the skirt 74 to be slidingly lowered or raised to a desired position with respect to wheel rotation axis 40 and ground G. The adjustable connector shown in the drawings includes a pair of spaced, elongate apertures 78, 80 defined vertically through a rearward face of the skirt 74. Non-elongated apertures 84, 86 are defined through the front face 72 of shroud 70 and aligned within a portion of respective elongate apertures 78, 80. Fasteners, here bolts 88, 90 and nuts 92, 94, are received through respective apertures 84, 86 and elongate aperture 78, 80 to thereby slidingly couple the shroud and skirt together along the length of the elongate aperture. Although these fasteners may be tightened to fix the height of skirt 74 relative to shroud 70, it is preferable that the connectors be maintained in a loosened state so that the shroud 70 and skirt 74 may be slidingly coupled relative to one another along the length 82 of the elongate aperture. The bottom edge 76 of skirt 74 is thus variably slidable to a desired height above the floor G and below the rotation axis 40 of the wheels 24, 26 depending upon an upward force that may be imparted to the skirt 74.

The connectors 88, 90, 92, 94 are preferably maintained within apertures 78, 80, 84, 86 in a slidable configuration with a looseness that allows the skirt 74 to slide to its lowest position under force of gravity, e.g. when the non-elongate apertures 84, 86 are aligned at the top of elongate apertures 78, 80 as shown in FIG. 2. In such a configuration, the skirt 74 is vertically moveable within a float distance 82 relative to a horizontal plane defined by the axle 36 so that upward force against the bottom edge 76 of the skirt causes the skirt 74 to slide upward with respect to the shroud 70 and then drop downward under force of gravity to the low point once the upward force on the skirt bottom edge is removed.

In a preferred embodiment, the shroud 70 is configured to extend in a generally U-shape configuration with the front face 72 disposed between shroud side-panels 96, 98 having spaced terminal ends 100, 102. Axle clamps, such as connectors 104, 106, are positioned adjacent each terminal end 100, 102 of the side panels 96, 98 and extend outboard of the side panels to accommodate the length 66 of axle 36. When the skirt 74 is coupled to the front face 72 of the shroud 70, the bottom edge 76 preferably extends below these connectors 104, 106.

Each of the connectors 104, 106 preferably includes a notch 108, 110 adapted to receive a respective one of the shoulders 50, 52 therein. Coaxial apertures on opposing sides of the notch, e.g. apertures 112, 114 adjacent notch 110, are aligned with apertures positioned adjacent a terminal end of the shoulders, e.g. aperture 116 on axle shoulder 52. A pin passes through the coaxial apertures and fixes a respective one of the shoulders within the notch, e.g. pin 118 passing through coaxial apertures 112, 114, 116 to fix shoulder 52 within notch 110.

In one aspect of the pallet truck wheel assembly 10, the shoulders 50, 52 are configured with a non-round profile, and more preferably with a square profile as shown in the drawings. Other potential examples of shoulder profiles include half-hexagonal, half-octagonal, oval, asymmetric shapes, or other profiles having at least one flat edge. The notches 108, 110 receiving the shoulders 50, 52 are configured with a complementary profile, e.g. square, so that that the shoulders are snuggly received within the notches and non-slippingly retained therein. Even without pin 118 in place, the non-round profile of the axle shoulders and complementary notch prevent the toe guard 68 from rotating downward so that the bottom edge 76 contacts the floor G and impedes movement. Although notches 108, 110 are shown with one open side on the connectors 104, 106, it is understood that such connectors can also include a fully enclosed aperture and notch open on more than one side.

Wheels 24, 26 are retained in spaced apart position on axle 36 via contact of the wheel hubs 58 or bearings 55, 57 with central axle edges 62, 64 on the inboard sides of the wheels, and via contact with snap rings 120, 122 on outboard sides of the wheels. The axle 36 includes annular grooves 124, 126 adjacent outboard portions of the wheels and snap rings 120, 122 received within the annular grooves. The snap rings 120, 122 have a greater diameter than the wheel central bores 54, 56 so that the wheels are maintained in position on the axle between the central portion 48 of the axle 36 and the snap rings 120, 122.

In other aspects of the invention, the skirt 74 is formed of a unitary body having a U-shaped configuration with skirt side panels 128, 130 that nestingly capture the shroud side panels 96, 98 but that extend forwardly toward, but not cover, the connectors 104, 106 on the shroud 70. The bottom edge 76 of the skirt 74 thus extends in such a U-shaped configuration and helps protect an operator's foot from sliding under the wheel from the side. In an aspect of the invention, the skirt side panels extend approximately 2¼" forward of its rearmost forward face.

Figure 4:
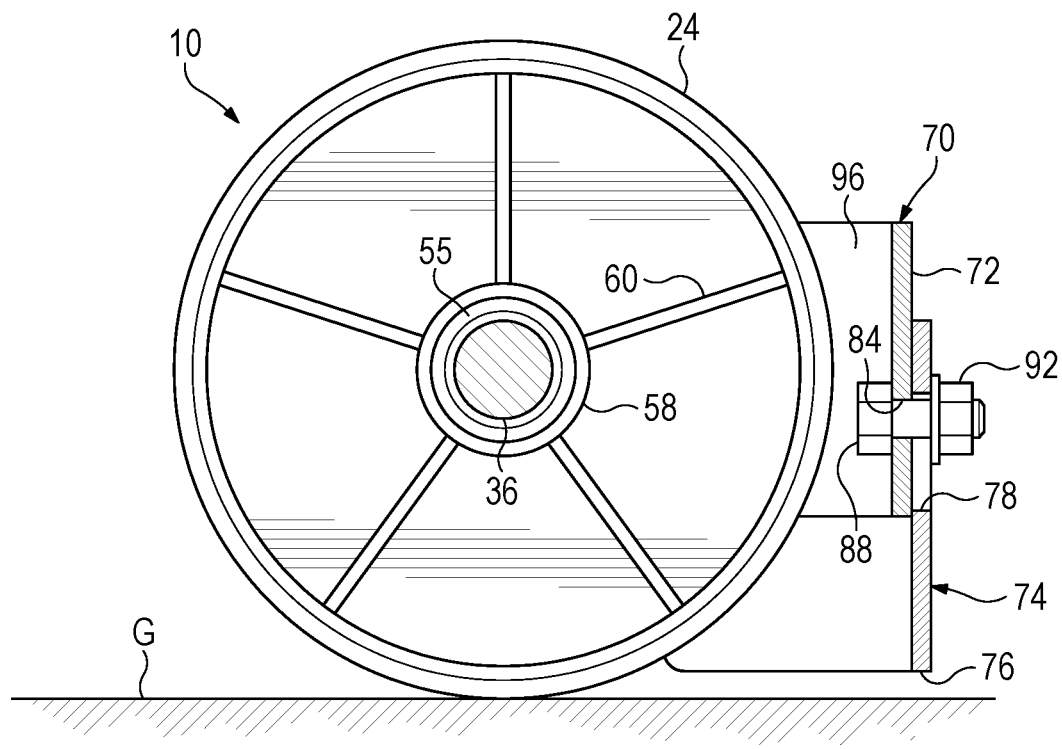
FIG. 4 is a side elevation view of the toe guard wheel assembly taken in section along line 4-4 in FIG. 2.
Figure 5:
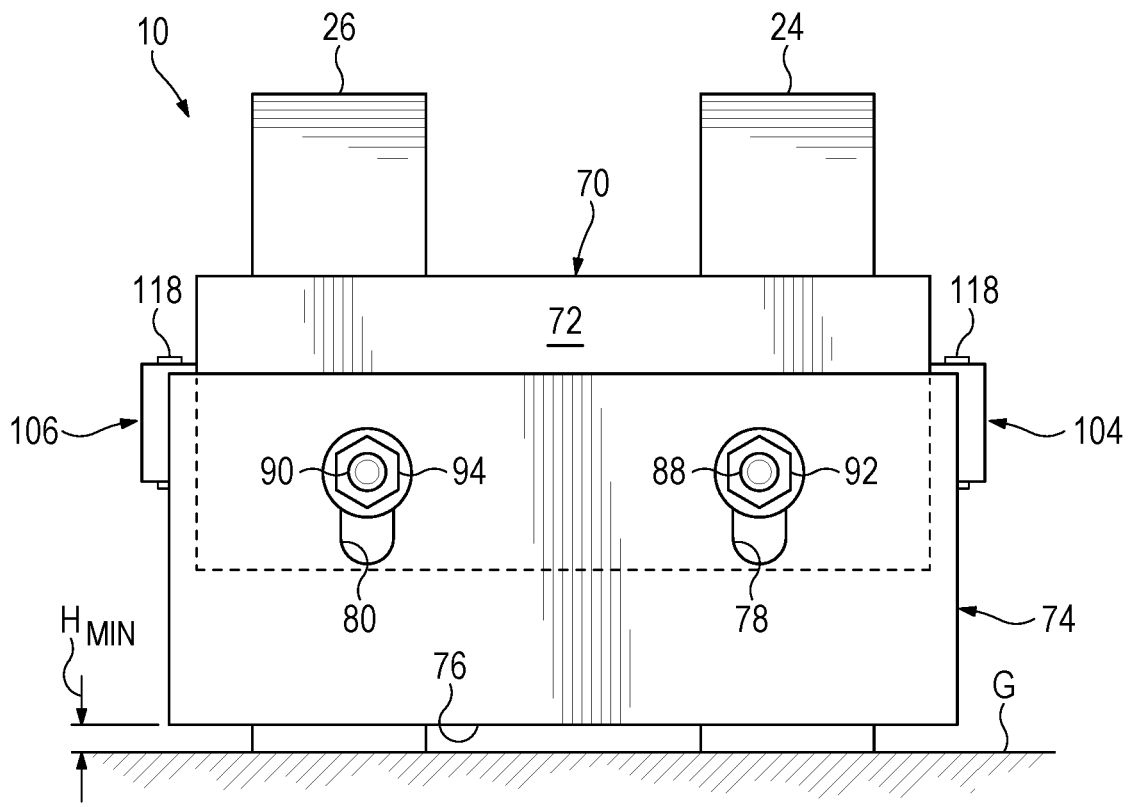
FIGS. 5 and 6 illustrate front elevation views of the toe guard wheel assembly of FIG. 2 with the skirt positioned at two different elevations on the toe guard shroud.
Figure 6:
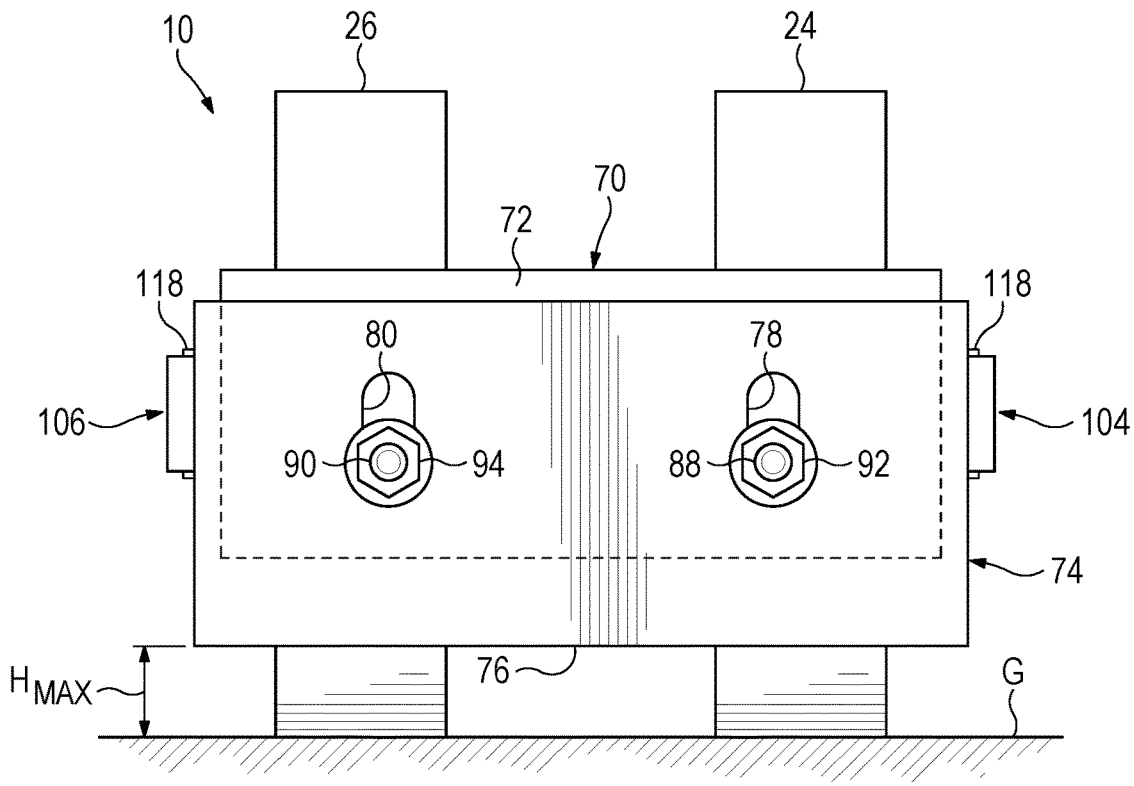

FIGS. 4-6 illustrate the height adjustment of the skirt 74 so that the bottom edge 76 thereof is adjustably spaced and floats above the ground G between a minimum float height $H_{MIN}$ (FIG. 5) and a maximum float height $H_{MAX}$ (FIG. 6) to accommodate varying safety needs and conditions. FIGS. 4 and 5 illustrate configuration of the skirt 74 in relation to the shroud 70 so that the bottom edge 76 is at a lowest position where height $H_{MIN}$ is just above the ground G. In this "low" position, the fastener bolts 88, 90 and nuts 92, 94 are at the highest position on the elongate apertures 78, 80—e.g. apertures 84, 86 are aligned with the upper portion of elongate apertures 78, 80. In contrast, FIG. 6 illustrates a skirt 74 at its highest adjusted position so that gap $H_{MAX}$ between the bottom edge 76 of skirt 74 and ground G is greater. In this "high" position, the fastener bolts 88, 90 and nuts 92, 94 are at the lowest position on the elongate apertures 78, 80—e.g. apertures 84, 86 are aligned with the lower portion of elongate apertures 78, 80. The float between the highest and lowest positions is approximately one inch, and the minimum floor clearance $H_{MIN}$ should preferably be set to between ½" and ¾". It is understood that the elongate apertures 78, 80 can be located on the shroud 70 and the regular apertures 84, 86 on the skirt without departing from the spirit of the invention.

The primary advantage of having a protective element 10 with a float 82 is in accommodating rolling surfaces or shop floors with various impediments or objects. For instance, it is not uncommon for an operator to have to roll the pallet truck 12 over dock plates or cables placed on the shop floor. As a result, a fixed height bottom edge 76 of the skirt or any other protective element would necessarily raise as the steer wheels roll over the impediment. This may lift the protective edge 76 above the level of an operator's toes so that the operator's shoe or boot may slide under the steer wheel. If the protective edge is set too low to prevent this from happening, the protective edge 76 may stop the steer wheels from rolling over the impediment, which is also an undesired result. By including a float 82, the protective lower edge 76 is moved upward by impact with the impediment but then slides back down to $H_{MIN}$ relative to the ground G once the impediment is removed. As a result, the gap between the floor or impediment and the protective edge 76 is always less than the height of an operator's toes. In alternate embodiments, this protective edge is shaped to reduce the chance of catching on the impediment, e.g. with a rounded or chamfered lower edge, so that rolling contact with the impediment imparts an upward force on the protective edge and slides the skirt 74 upward with respect to the shroud 70.

Figure 7:
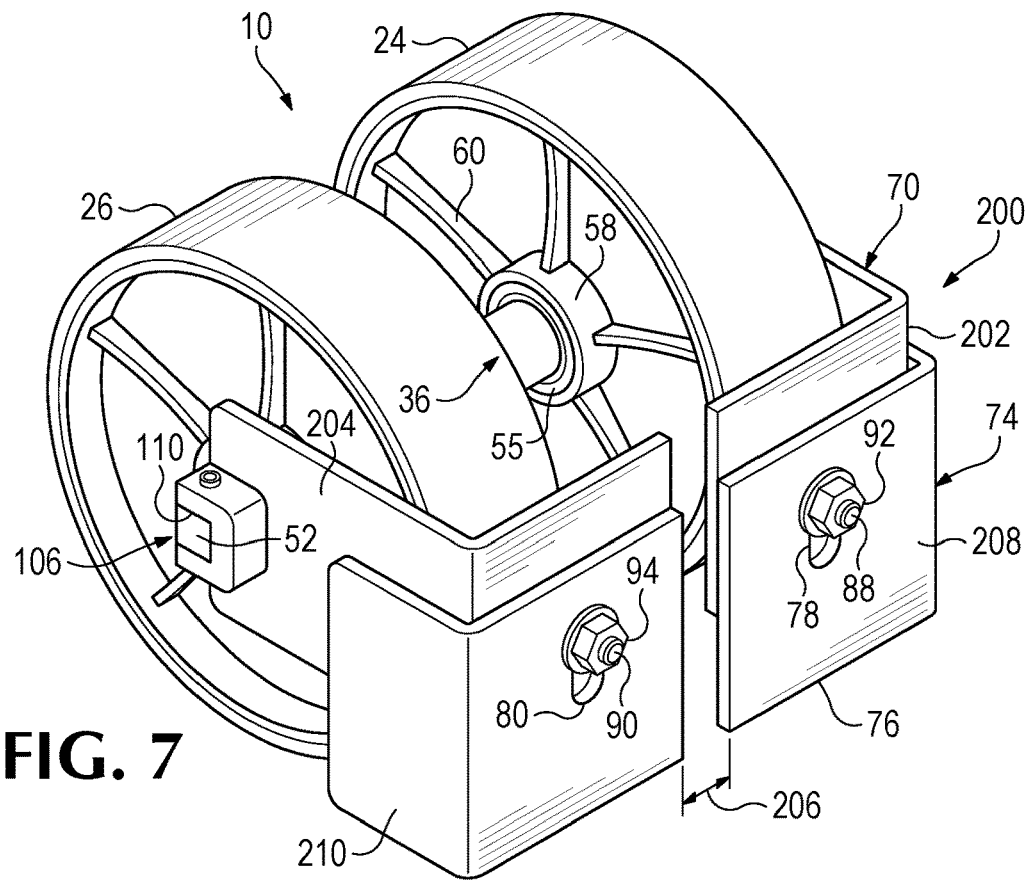
FIG. 7 is a perspective view of the toe guard wheel assembly showing an alternate, split plate embodiment of the invention.

FIG. 7 illustrates a wheel assembly 10 with an alternate "split" aspect of the toe guard 200. The U-shaped shroud 70 of alternate aspect 200 is formed of two L-shaped portions 202, 204 spaced by a gap 206 along a front face thereof. The skirt 74 includes left and right split sides 208, 210 spaced minimally apart by the gap 206 between the two L-shaped portions of the shroud.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A pallet truck wheel assembly toe guard for use on a pallet truck of a type having a rear steer wheel rotatable about an axle residing and steerable within a horizontal plane relative to said pallet truck, the toe guard comprising:
a shroud including shroud side-panels having spaced terminal ends;
connectors located adjacent each of the terminal ends of the side panels; and
a skirt slidingly coupled to the shroud and having a bottom edge that extends below the connectors and is vertically moveable within a float distance relative to a horizontal plane defined by the connectors,
wherein the connectors are configured to attach to the rear steer wheel axle on a pallet truck with the skirt extending below the axle to a position that prevents an operator's toes from sliding under the skirt and getting crushed by the rear steer wheel of the pallet truck,
wherein each of the connectors include a clamp assembly comprising:
a notch configured to receive an end of the rear steer wheel axle;
coaxial apertures on opposing sides of the notch; and
a pin passing through the coaxial apertures and fixing the axle within the notch.

2. The pallet truck wheel assembly toe guard of claim 1, wherein the notch is configured with a non-round profile.

3. The pallet truck wheel assembly toe guard of claim 2, wherein the notch is configured with a square profile.

4. The pallet truck wheel assembly toe guard of claim 1, further including an adjustable connector between the shroud and skirt structured to enable the bottom edge of the skirt to be lowered or raised to a desired vertical position with respect to the connectors.

5. The pallet truck wheel assembly toe guard of claim 4, wherein the adjustable connector comprises:
an elongate aperture having a length extending vertically through one of either the shroud front face or the skirt;
an aperture through the other of the shroud front face and the skirt, said aperture aligned within a portion of the elongate aperture; and
a fastener received through the aperture and elongate aperture and slidingly coupling the shroud and skirt together along the length of the elongate aperture, wherein the fastener may be loosened and tightened so that the shroud and skirt may be adjustably coupled relative to one another along the length of the elongate aperture.

6. A pallet truck wheel assembly toe guard for use on a pallet truck of a type having a rear steer wheel rotatable about an axle residing and steerable within a horizontal plane relative to said pallet truck, the toe guard comprising:
a shroud including shroud side-panels having spaced terminal ends;
connectors located adjacent each of the terminal ends of the side panels; and
a skirt slidingly coupled to the shroud and having a bottom edge that extends below the connectors and is vertically moveable within a float distance relative to a horizontal plane defined by the connectors,
wherein the connectors are configured to attach to the rear steer wheel axle on a pallet truck with the skirt extending below the axle to a position that prevents an operator's toes from sliding under the skirt and getting crushed by the rear steer wheel of the pallet truck, wherein the skirt and bottom edge have a U-shaped configuration with the skirt side-panels extending forwardly toward but not covering the connectors on the shroud.

7. The pallet truck wheel assembly toe guard of claim 6, wherein the U-shaped configuration of the shroud is formed of two L-shaped portions spaced by a gap along a front face thereof.

8. The pallet truck wheel assembly toe guard of claim 7, wherein the skirt includes left and right split sides spaced minimally apart by the gap between the two L-shaped portions of the shroud.

9. The pallet truck wheel assembly toe guard of claim 6, further including an adjustable connector between the shroud and skirt structured to enable the bottom edge of the skirt to be lowered or raised to a desired vertical position with respect to the connectors.

10. The pallet truck wheel assembly toe guard of claim 9, wherein the adjustable connector comprises:
an elongate aperture having a length extending vertically through one of either the shroud front face or the skirt;
an aperture through the other of the shroud front face and the skirt, said aperture aligned within a portion of the elongate aperture; and
a fastener received through the aperture and elongate aperture and slidingly coupling the shroud and skirt together along the length of the elongate aperture, wherein the fastener may be loosened and tightened so that the shroud and skirt may be adjustably coupled relative to one another along the length of the elongate aperture.

* * * * *